United States Patent [19]

Shei

[11] Patent Number: 4,750,157

[45] Date of Patent: Jun. 7, 1988

[54] SEISMIC VIBRATOR EARTH IMPEDANCE DETERMINATION AND COMPENSATION SYSTEM

[75] Inventor: Sun-Sheng Shei, Dallas, Tex.

[73] Assignee: Standard Oil Production Company, Cleveland, Ohio

[21] Appl. No.: 46,356

[22] Filed: May 6, 1987

[51] Int. Cl.$^4$ .............................................. G01V 1/00
[52] U.S. Cl. ......................................... 367/45; 367/54; 367/190; 73/574
[58] Field of Search ................. 367/38, 45, 50, 51, 367/54, 189, 190, 46, 49; 181/101, 108, 113, 121, 401; 364/421; 73/589, 574

[56] References Cited

U.S. PATENT DOCUMENTS

| 3,946,598 | 3/1976 | Towne et al. ........................ 73/574 |
| 4,184,144 | 1/1980 | Rickenbacker ..................... 367/137 |
| 4,339,810 | 7/1982 | Nichols et al. ........................ 367/49 |
| 4,646,274 | 2/1987 | Martinez ............................. 367/46 |
| 4,670,863 | 6/1987 | Sallas et al. ........................ 367/189 |

Primary Examiner—Charles T. Jordan
Assistant Examiner—John W. Eldred
Attorney, Agent, or Firm—Larry W. Evans; David J. Untener; William A. Heidrich

[57] ABSTRACT

An earth impedance determination and compensation system for use with a seismic vibrator utilizes output signals from accelerometers on the baseplate and reaction mass portions of the vibrator to create a signal indicative of the near-surface weathered earth layer impedance below the baseplate. The impedance signal is utilized to generate parameter signals which are indicative of the compressional and shear wave patterns generated by the baseplate and may be used to more rapidly and accurately design seismic source arrays to optimize the wave pattern emanating therefrom. One of the parameter signals is directly indicative of the travel time thickness of the weathered surface layer and may be used to accurately determine the static correction factor attributable solely to weathered layer topography. The parameter signals are also utilized to generate a weathered layer filter signal which is combined with a ground force signal to generate a signal that is indicative of the actual wave form sent into the sub-weathered layer earth area and may be used in the cross-correlation process to significantly enhance the accuracy thereof. The weathered layer filter signal is also used in conjunction with a predetermined wave form signal to generate a corrective drive signal that is fed back to the main vibrator drive system. The use of this corrective drive signal controls the vibrator in a manner such that the seismic waves generated thereby into the sub-weathered layer region are maintained in a predetermined form regardless of changes of earth impedance below the vibrator baseplate.

24 Claims, 2 Drawing Sheets

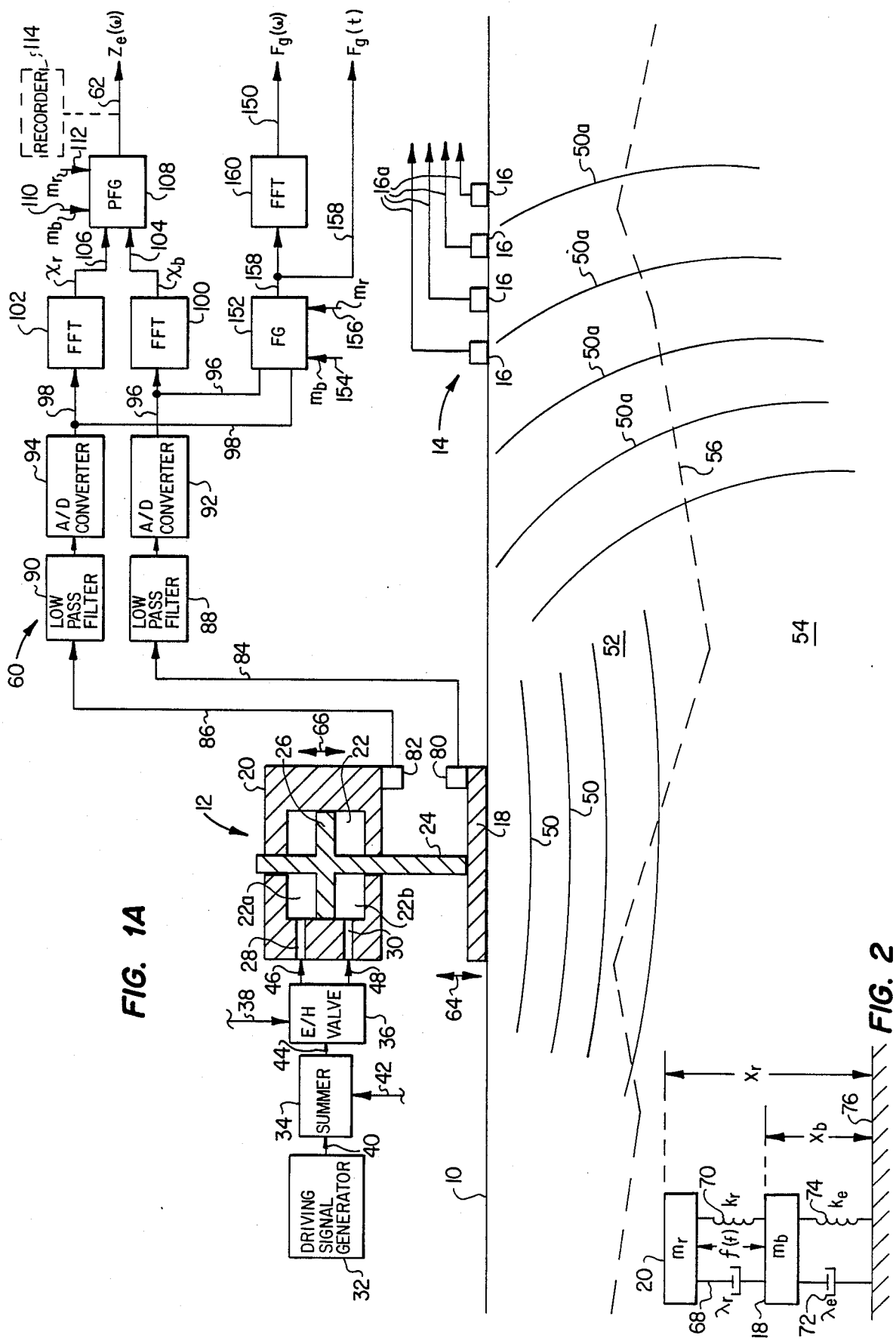

SEISMIC VIBRATOR EARTH IMPEDANCE DETERMINATION AND COMPENSATION SYSTEM

BACKGROUND OF THE INVENTION

The present invention relates generally to seismic hydrocarbon exploration, and more particularly provides an earth impedance determination and compensation system for use with a seismic vibrator or the like.

Seismic exploration for oil and gas typically utilizes various seismic energy sources to excite seismic waves which probe the subsurface geological structure of the earth. The reflected seismic waves return to the earth's surface, are detected by surface geophones or seismometers, and then are recorded. These signals are operated on utilizing digital computers to manipulate the seismic data to produce a processed seismic section, as a function of two-way travel time and the lateral spatial coordinate. The processed seismic section is then analyzed or interpreted to infer the subsurface geology and the structure of the earth. This interpretation is used to identify and delineate structures where hydrocarbons are likely to accumulate.

In its simplest form, the seismic reflection exploration technique is an echo-ranging technique, similar to the radar or sonar system, in which the travel time of the reflected seismic wave is the desired information. Historically, only the time measurements of the reflection events were considered in seismic reflection profiling. This travel time method was useful in exploring and mapping the earth's subsurface structure wherein structural features are likely to trap hydrocarbons as they migrate through the porous zones in the earth. Countless discoveries of oil and gas were made throughout the world by mapping these structural traps. However, this method is an indirect one. Hydrocarbon accumulations are not mapped directly, but structures where hydrocarbons might accumulate are mapped, and these structures are subsequently tested by drilling.

Exploration objectives have changed gradually from the large-scale structural traps as both the number and size of undiscovered structural traps have diminished. The more prevalent objective now is to map the more subtle stratigraphic traps which are more numerous and are believed to contain several times the quantity of hydrocarbons estimated to exist in undiscovered structural traps. As this focus has changed, so has seismic exploration technology. It has advanced and become more sophisticated since mapping stratigraphic variations is a more formidable problem. Instead of reflected seismic wave travel time, other features in the received signals, such as variation in amplitude and phase or wave shape, have become more and more important since they provide information that may make it possible to detect hydrocarbons directly. The amplitude and wave shape of recorded signals depend on many factors. These include, among others: (1) seismic sources, (2) their couplings to the ground, (3) near-surface weathered layers, (4) the nature and characteristics of the receiving and recording instruments, and (5) the reflection characteristics from deep geological structures.

Of these five factors, the reflection characteristics from deep geological structures is the pivotal factor in determining the nature of such deep geological structures. The other four factors tend to "mask" or alter the form of the reflected waves from the deep geological structures of interest and, accordingly, must be controlled or accounted for to provide a true reflective picture of the deep layer structure of interest. This is especially true if it is desired to map the lateral stratigraphic and lithological variation of the deep layers. Once these factors have been in some manner taken into account, the subtle features that are solely determined by the deeper structures with hydrocarbon potential can then be inferred. However, this inference process is presently quite complex for a variety of reasons.

One of the more important direct hydrocarbon detection techniques is the "bright" spot or hydrocarbon indicator (HCI) technique in which the amplitude of reflections are mapped. Reservoirs saturated with gas have different properties than brine-saturated reservoirs. High amplitude reflections are indicative of gas saturization. This technique has been very useful in the marine environment, but has enjoyed considerably less success when applied on land. A key reason for the lack of success on land is that, in the marine environment, both the sources and receivers are in a homogeneous medium (water) and observed lateral variations in reflection amplitude maybe attributed to lateral variations in the reflectors due to pore fluid differences at reservoir depths. On land, the variations in the earth's surface are too great. In land seismic acquisition, the most widely used seismic source is known as the "VIBROSEIS" system, a system developed by the Continental Oil Company in the 1950's. In this system, and other systems like it, a servo-hydraulic vibrator actuates a steel baseplate pressed against the ground. An oscillatory motion rather than an impulsive one is utilized. The seismic signal usually consists of an oscillatory wave form of slowly varying frequency, typically within the frequency band 10 to 100 Hz, and lasts for 7 seconds or longer. The advantage of the vibroseis and similar systems stems from the fact that total energy is spread over a long time. The instantaneous power is, therefore, greatly reduced and is less sensitive to noise bursts. The system can be advantageously utilized even in cities and towns where the use of dynamite or other explosives may be dangerous and prohibited. The need for shot-holes for explosives is also avoided.

The seismic wave form generated by the vibroseis system is a long wave train. The received signals, therefore, may be thought of as a superposition of many long wave trains with different amplitudes and time delays produced by reflecting horizons in the subsurface structures. Special processing techniques are required to make recorded signals interpretable. The processing technique amounts basically to looking for the long swept-frequency signal in the recorded wave train, e.g., comparison of these two signals with a progressive increase in time delay. The most meaningful quantitative statistical measure of similarities of signals is the cross-correlation function. The cross-correlation between the recorded signal and the input signal is a way to reduce the recorded signal and to obtain useful information about geology from the vibroseis system. In idealized situations, each reflection event after cross-correlation is represented by a short-duration, zero-phase wavelet (symmetric wavelet). This wavelet is the autocorrelation of the signal sent out by the vibrator. After cross-correlation, the resultant trace is similar to the seismic trace obtained with an explosive source, and further analysis or interpretation may proceed in the same way.

If the exploration objective is the detection of subtle stratigraphic traps, the amplitude and phase of the radiated seismic source must be tightly controlled. In the case of the vibroseis system, the vibrator is connected to a base plate pressed against the ground. At different locations, the ground reacts with different elastic impedances to the motion of the base plate. Therefore, in general, the vibroseis system's seismic radiation will be different at different locations even when the same electrical drive signals to the vibrator are used.

It is well known that if the vibroseis system is operated in an open-loop fashion, the radiated seismic wave does not have a constant-phase relationship with the electric drive signal used as a reference in the cross-correlation process. It is customary, however, to operate the vibroseis system in a closed loop fashion with a phase-lock mechanism to insure the output is phase-locked to the electrical drive signal. To achieve this phase-lock mode, it is customary to utilize an output signal from the vibrator to correct the drive signal to achieve the desired phase-lock. Typically, such vibrator output signal is the acceleration of the base plate, the reaction mass portion of the vibrator, or a weighted average of the two accelerations (with respect to masses). The purpose of these phase-lock techniques is to control the form of the seismic waves generated into the earth so that known generated wave forms can be used in the cross-correlation process. However, because of variation in the earth's impedance at different generating and receiving locations, it has been found that even if phase-lock is achieved, the generated wave form transmitted into the earth varies at different surface locations. It is this heretofore uncompensated for variance in earth impedance which has rendered the cross-correlation process inaccurate and difficult, concomitantly rendering the use of the "bright" spot seismic exploration method difficult and inaccurate in land applications.

Recent advances in technology regarding the control of the vibrator have been directed at the problem of base plate decoupling from the ground. This situation can occur at high-drive levels using the base plate acceleration as a reference. When such decoupling occurs, harmonics of the control signal are generated, and there is an overall degradation in the quality of the process seismic data. As exemplified in U.S. Pat. No. 4,184,144, a method known as "ground-force control" has been developed to minimize the base plate's decoupling by controlling the force of the base plate on the earth. In this ground force control method, a control signal is used which is a weighted average of the base plate acceleration signal and the reaction mass acceleration signal. By using this weighted average of such vibrator output signals, the ground force of the base plate may be controlled to prevent base plate decoupling. However, implementation of this method still does not assure that a seismic wave of predetermined form is actually being transmitted into the earth. This important deficiency is again due to failure to account for the variation in the earth's impedance at various surface locations.

This variation in earth impedance, which can cause the cross-correlation process to be inaccurate and difficult, and has heretofore rendered the "bright" spot exploration technique rather ineffective in land applications, is due primarily to impedance variations in the near-surface "weathered" layer of the earth. Furthermore, this variation in earth impedance requires using a statistical rather than a deterministic static correction process, which is more prone to errors. The weathered layer is the layer at the surface of the earth that has very low seismic velocity and density. It might have rapid spatial variation in thickness that may even be subject to seasonal fluctuation in physical properties due to rainfall and other weather conditions. The reaction impedance of this layer to the vibrator force, as previously mentioned, will be different at different locations. Thus, even when the force of the vibrator can be made to be identically the same (e.g., when the "ground-force control" system is utilized) there is simply no guarantee that the amplitude and phase of the generated seismic wave will be the same as it passes through the weathered layer of the earth as different locations thereon. Accordingly, this same uncertainty has existed with respect to the form of seismic waves actually being transmitted into the sub-weathered layer portions of the earth that are being probed with the seismic reflection profiling method.

The effect of the weathered layer is not just a constant time shift or a constant amplitude factor which can be accounted for by the usual static and amplitude corrections used in seismic processing. The contrast between the weathered layer and the sub-weathered layer is usually quite large. Therefore, the weathered layer will cause severe reverberation problems. Depending on the travel time in the weathered layer, the effect may be separable as different reflections or may be superposed with the overall change of the wave shape in the cross-correlated record section. In either event, such effect will contaminate the reflection events from the deeper geological structures which may contain hydrocarbons. The presence of the weathered layer will change the amplitudes and the phases of the seismic waves that propagate through it. The effect is highly frequency-dependent and also changes the radiation patterns of the vibrator.

Another impedance-related problem has been that because of impedance variances it has been difficult to accurately determine the compressional and shear wave forms (the "P" and "S" wave forms) of the seismic waves being propagated into the earth in order to properly arrange an array of seismic power sources to optimize the generation of "useful" seismic waves and attenuate undesired seismic waves. Heretofore such array arrangement has been conducted on a laborious trial and error basis founded upon often inaccurate estimates of such "P" and "S" wave forms or, if done theoretically, has used unrealistic models for the vibrator radiation.

It can be seen from the foregoing that uncompensated for variations in the earth's near surface weathered layer impedance have heretofore presented a barrier to the most effective implementation of the seismic exploration technique to land applications and, in particular, has limited the effectiveness of the "bright" spot technique. It is accordingly an object of the present invention to provide apparatus and methods for use with seismic vibrators, and other seismic energy sources, which will determine and compensate for variation in earth impedance in a manner eliminating or substantially minimizing above-mentioned and other problems and limitations associated with conventional seismic land exploration systems.

SUMMARY OF THE INVENTION

The present invention provides an earth impedance determination and compensation system for use with a seismic power source, such as a hydraulically powered seismic vibrator having a reaction mass portion and a baseplate portion movably coupled to the reaction mass portion and in contact with the earth. The system of the present invention uniquely functions, during operation of the vibrator, to:

1. Generate a signal indicative of the near-surface weathered earth layer impedance beneath the baseplate portion of the vibrator;

2. Generate a signal which is representative of the actual form of the seismic wave train transmitted into the sub-weathered layer portion of the earth, regardless of impedance variances within the weathered layer beneath the baseplate;

3. Selectively vary the driving signal to the vibrator in a manner causing the baseplate to transmit to the sub-weathered layer portion of the earth a seismic wave train of a predetermined form which is independent of variances in weathered layer impedance;

4. Generate a signal indicative of the actual travel time thickness of the weathered-surface layer beneath the baseplate, thereby permitting the static correction factor attributable to the weathered layer impedance to be accurately and directly determined; and 5. Generate a set of parameter signals which are combinatively indicative of the "P" and "S" wave forms propagated into the earth to thereby provide for a more rapid and accurate arrangement of a source array to either maximize the seismic wave pattern in a direction of a particular target or to minimize the excitation of undesirable seismic wave patterns.

In a preferred embodiment of the impedance determination and compensation system of the present invention, these unique and very desirable results are achieved by providing accelerometer means on the vibrator baseplate and reaction mass to generate electrical signals that are indicative of the accelerations of the baseplate and reaction mass. These two signals are appropriately filtered, converted to digital form, and then further converted to signals indicative of the Fourier components of the baseplate and reaction mass displacements. Utilizing a suitable programmable function generator, the displacement signals are combined with input signals indicative of the masses of the baseplate and reaction mass to responsively generate an output signal having a magnitude equal to:

$$-m_r s \left( \frac{x_r}{x_b} + \frac{m_b}{m_r} \right)$$

wherein:
$m_r$ = the mass of the reaction mass;
$m_b$ = the mass of the baseplate;
$s = i 2\pi f$, a frequency parameter inherently present in the Fourier component signals;
$x_r$ = the Fourier component of the reaction mass displacement; and
$x_b$ = the Fourier component of the baseplate displacement.

The magnitude of this output signal is indicative of $Z_e(\omega)$, the Fourier component of the near-surface weathered layer impedance beneath the vibrator baseplate.

The digital baseplate and reaction mass acceleration signals, $\ddot{x}_b$ and $\ddot{x}_r$, are transmitted to a function generator which also receives input signals indicative of $m_b$ and $m_r$ and responsively generates an actual ground force signal $F_g(t)$ having a magnitude of $m_b \ddot{x}_b + m_r \ddot{x}_r$. The signal $F_g(t)$ is then transformed to its Fourier counterpart signal $F_g(\omega)$, the signals $F_g(t)$ and $F_g(\omega)$ being utilized in a subsequently described portion of the impedance determination and compensation system.

The impedance output signal $Z_e(\omega)$ is transmitted to the comparator portion of an iterative signal generator which also includes a programmable function generator into which is programmed a suitable theoretical model of earth impedance expressed in terms of selected parameters which include the parameters $$\left(\frac{\alpha_1}{\alpha_2}\right), \left(\frac{H}{\alpha_1}\right) \text{ and } \left(\frac{\rho_1}{\rho_2}\right)$$

where:
$H$ = the depth of the weathered layer;
$\alpha_1$ = the compressional wave velocity for the weathered layer;
$\alpha_2$ = the compressional wave velocity for the underlying half-space;
$\rho_1$ = the density of the weathered layer; and
$\rho_2$ = the density of the underlying half-space.

Signals representing initial estimates (or "starting values") of the selected parameters are suitably transmitted to the function generator which responsively transmits to the comparator a signal $Z_{th}(\omega)$ indicative of the theoretical earth impedance resulting from incorporation into the programmed-in model of the starting values of the selected parameters. The comparator compares the $Z_e(\omega)$ and $Z_{th}(\omega)$ signals and responsively transmits to the function generator a deviation signal indicative of the difference between the two impedance signals. Upon receiving the deviation signal, the function generator adjusts one or more of the estimated parameter values and outputs an adjusted $Z_{th}(\omega)$ signal which is again compared to the actual impedance signal $Z_e(\omega)$. This iterative process continues until the error signal is reduced to a predetermined level, at which point the function generator outputs seven final parameter signals which are respectively indicative of the parameters $$\left(\frac{\alpha_1}{\alpha_2}\right), \left(\frac{H}{\alpha_1}\right), \left(\frac{\rho_1}{\rho_2}\right), \rho_1, \alpha_1, \left(\frac{\alpha_1}{\beta_1}\right) \text{ and } \left(\frac{\alpha_1}{\beta_2}\right)$$

which correspond, via the programmed-in theoretical impedance model, to the actual impedance signal $Z_e(\omega)$.

The seven final parameter signals are combinatively indicative of the "P" and "S" wave forms being transmitted into the earth by the vibrator baseplate. By utilizing such final parameter signals to determine these compressional and shear wave forms an array of seismic generating locations may be more rapidly and accurately designed to either maximize (or "focus") the overall seismic wave pattern in the direction of a particular exploration target, or to minimize the excitation of undesirable seismic wave patterns.

The final parameter signal $$\left(\frac{H}{\alpha_1}\right)$$

is, of course, representative of the travel time thickness for the nearsurface weathered earth layer, and may accordingly be utilized to very accurately perform the static correction for the seismic wave travel time variance attributable to weathered layer topography. This feature of the present invention eliminates the previous necessity of either estimating the weathered layer seismic wave travel time, or drilling and blasting to mechanically measure such travel time.

The three final parameter signals are transmitted to a function generator which analyzes the signals and responsively generates a near surface weathered layer filter signal $F_1(\omega)$ having a magnitude equal to:

$$\frac{e^{i\left(\frac{\omega H}{\alpha_2}\right)}}{\left(\frac{\rho_2}{\rho_1}\right)\cos\left(\frac{\omega H}{\alpha_1}\right) + i\left(\frac{\alpha_1}{\alpha_2}\right)\sin\left(\frac{\omega H}{\alpha_1}\right)}$$

which represents the seismic response of a single weathered layer model, the parameter "i" being the square root of minus one, and the parameter "$\omega$" being the angular frequency which equals the quantity $2\pi f$.

Filter signal $F_1(\omega)$ and the actual ground force signal $F_g(\omega)$ are transmitted to a signal multiplier which multiplies the two signals are responsively generates an output signal $S(\omega)$ which represents the Fourier component of the actual wave form transmitted by the vibrator baseplate into the sub-weathered layer portion of the earth. The signal $S(\omega)$ is then transformed into its time domain counterpart signal S(t) which may be converted, in a conventional manner, to a wavelet signal for use in the cross-correlation process.

Importantly, due to the use of the filter signal $F_1(\omega)$, the signal S(t) will accurately portray the sub-weathered layer propagated wave form regardless of where on the earth's surface the vibrator is placed. Stated otherwise, any uncertainty as to the form of waves entering the important sub-weathered layer area (due to varying weathered layer impedance) is removed in the present invention.

Finally, to enable the propagation of seismic waves of a predetermined form into the sub-weathered layer area of interest, regardless of earth impedance variance, the filter signal $F_1(\omega)$ is transmitted to a signal divider which, via a suitable signal generator, also receives and input signal $W_d(\omega)$ which represents the form of a wave train desired to be transmitted into the sub-weathered layer region of the earth. The signal divider divides the signal $W_d(\omega)$ by the signal $F_1(\omega)$ and responsively generates an output signal $F_{gd}(\omega)$ which is representative of the Fourier component of the ground force function required to drive the vibrator in a manner resulting in the propagation of the desired seismic wavetrain form into the sub-weathered layer portion of the earth.

The signal $F_{gd}(\omega)$ is transformed into its time domain counterpart signal $F_{gd}(t)$ which is transmitted to a comparator that also receives the actual ground force signal $F_g(t)$. The comparator outputs a deviation or correction signal d(t) which is utilized to adjust the master electrical drive signal that operates the vibrator so that the necessary ground force function is imparted to the vibrator.

It can be seen from the foregoing that the present invention uniquely eliminates from the seismic land exploration process the uncertainty and difficulty heretofore associated with determining and compensating for the variable impedance characteristics of the nearsurface weathered layer of the earth. The impedance determination and compensation system of the present invention also provides for significant improvements in the static correction and cross-correlation processes.

BRIEF DESCRIPTION OF THE DRAWINGS

FIG. 1A is a schematic diagram of a portion of an earth impedance determination and compensation system which embodies principles of the present invention and is connected to the vibrator portion of a seismic vibrator and receiver system utilized in seismic land exploration for hydrocarbon deposits;

FIG. 2 is a simplified schematic mechanical model of the vibrator, and the underlying near-surface weathered earth layer, from which various force and motion equations may be derived.

DETAILED DESCRIPTION

Figure 1B:
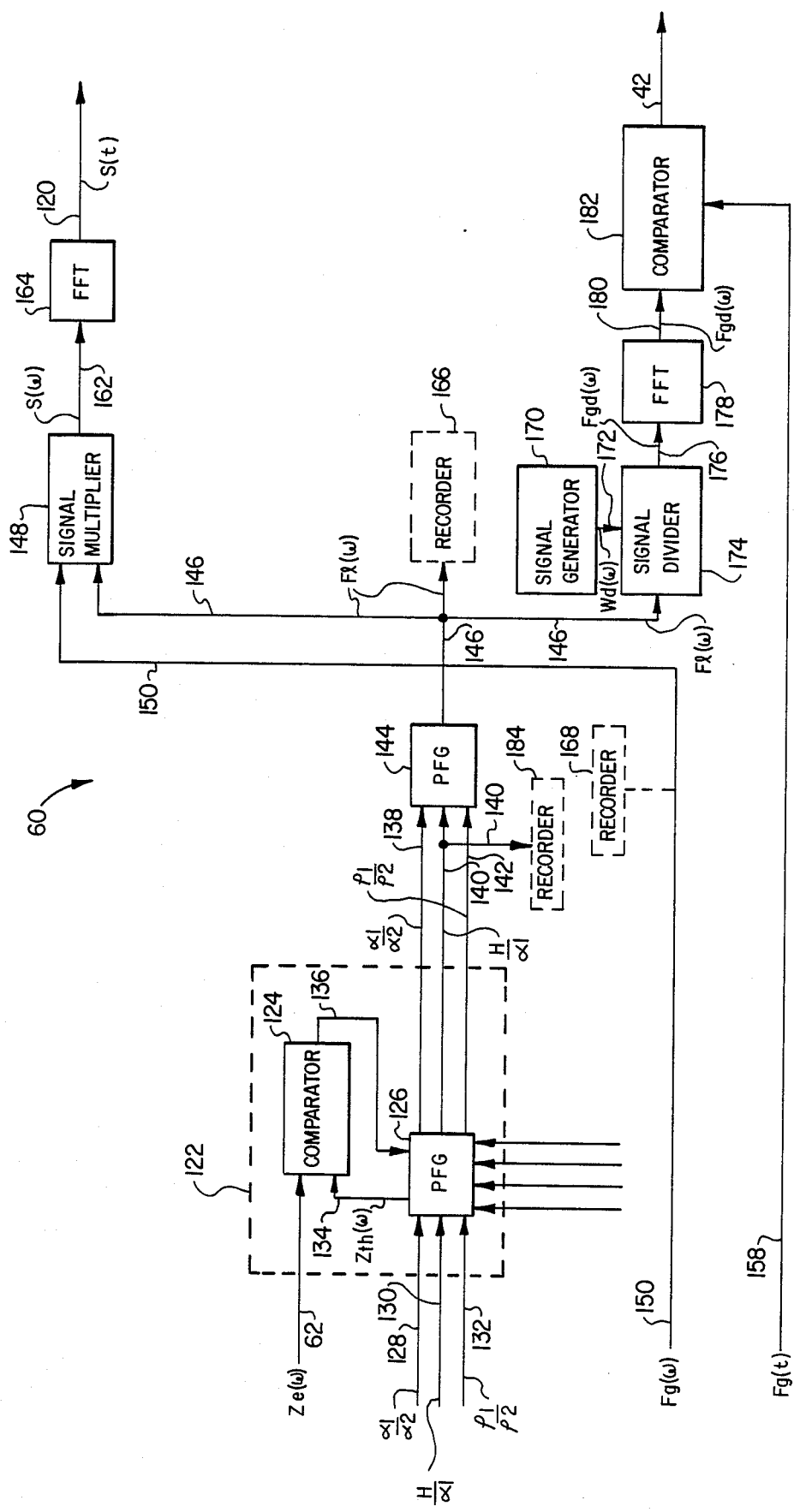
FIG. 1B is a schematic diagram of the balance of the earth impedance determination and compensation system.

Schematically depicted in FIG. 1A is a seismic exploration system which is disposed on the earth's surface 10 and includes a seismic energy source in the form of a vibrator 12, and an array 14 of seismic receiving elements in the form of geophones 16 which are spaced apart from the vibrator. The vibrator 12, which is of a conventional construction, includes a baseplate 18 which is normally held against the earth's surface by a holddown weight which typically comprises a vibrator transport vehicle (not illustrated in FIG. 1A). The vibrator also includes a heavy reaction mass 20 which is positioned directly above the base plate and has an internal cylinder 22 formed therein. The lower end of a vertically extending piston rod 24 is suitably anchored to the base plate 18 and extends upwardly through the cylinder 22, the piston rod being slidably received in suitable openings formed in the upper and lower walls of the reaction mass 20. The rod 24 has formed thereon a piston 26 which is slidably received in the cylinder 22 and divides it into upper and lower portions $22_a$, $22_b$ which open outwardly through the reaction mass 20 via ports 28 and 30, respectively.

The piston 26 is caused to vertically reciprocate within the cylinder 22 by means of a drive circuit which includes an electrical signal generator 32, a summer 34, and an electro-hydraulic valve 36 which receives high pressure hydraulic supply fluid 38 from a source thereof (not illustrated). The signal generator 32 is utilized to generate a generally sinusoidal master driving signal 40 that is transmitted to the summer 34 which, as subsequently described, also receives a drive-correction signal 42 and responsively transmits to the valve 36 a corrected driving signal 44. Signal 44 causes the valve 36 to alternately force pressurized hydraulic fluid, via outlet conduits 46 and 48, into the upper and lower cylinder portions 22a, 22b through the ports 28 and 30. This oscillatory supply of pressurized hydraulic fluid to the cylinder 22 causes the piston 26 and thus the base plate 18, to vertically oscillate in a generally sinusoidal fashion.

The oscillatory vertical force imposed upon the baseplate 18 causes it to generate seismic waves 50 downwardly into the earth. The seismic waves 50 excited by the baseplate 18 are propagated downwardly through the near-surface weathered earth layer 52 into the sub-weathered layer area 54 which may contain soughtafter deposits of hydrocarbons such as gas or oil. The general delineation between the weathered and sub-weathered earth portions is representatively denoted by the dashed line 56.

The seismic waves 50 strike various subsurface earth formations and are reflected therefrom back to the earth's surface in the form of reflected waves 50a whose forms are significantly altered compared to the initially generated seismic waves 50.

The reflected waves 50a are received by the array of geophones 16 which responsively transmit output signals 16a indicative of the form of the reflected waves. These output signals 16a may be utilized in the "cross-correlation" process in which various structures within the sub-weathered layer area 54 may theoretically be inferred from a comparison of the reflected wave forms to those of the propagated seismic waves 50. In this manner, the presence or absence of hydrocarbon deposits, or structures which may trap the same, may be determined.

This conventional hydrocarbon exploration technique, however, is subject to a variety of well known disadvantages, limitations and complexities which arise primarily due to the variance in earth impedance $Z_e$ of the weathered surface layer 52 at various locations along the earth's surface 10. The difficulties imposed upon this exploration process by such earth impedance variance manifest themselves in several different manners. For example, variance in such impedance can and does alter the form of the waves 50 emanating from the baseplate 18. Thus, even if a predetermined oscillatory motion is imparted to the piston 26, the interaction between the earth's surface and the baseplate 18 will be changed at various locations along the earth's surface due to the concomitant changes in the earth's impedance directly below the baseplate. Accordingly, it has proven difficult to generate seismic waves 50 of a predetermined form in different vibrator locations. Moreover, alterations in the forms of the reflected waves 50a are attributable in at least some measure to the impedance of the near surface weathered layer.

It is, of course, critical to the accuracy of the cross-correlation process that the effects of the varying earth impedance be known so that the effects on the reflected waves of structure within the sub-weathered layer area 54 can be accurately separated and analyzed. Heretofore, the separation of the weathered layer effects on the reflected waves has been a complex, laborious and often somewhat inaccurate process.

This is not to say that the weathered surface layer effects on the reflected waves cannot be determined and accounted for in conventional seismic exploration techniques. However, the conventional process for making this adjustment has been either to make the assumption that variations in the earth's impedance at the various vibrator and/or receiver locations can be ignored, or to actually make a physical determination of travel time variations at the various locations. This typically entails drilling holes at the various locations, setting off charges in the holes, recording and then analyzing the seismic patterns of the explosive charge. Alternatively, a detector may be placed in the hole and the radiation of the vibrator measured directly. This, of course, is an expensive and time-consuming process, and in many instances may be unfeasible and/or prohibited. Furthermore, all of the effects on the radiated wave may not be determined.

These and other problems associated with variance in earth impedance are uniquely solved in the present invention by its provision of an earth impedance determination and compensation system 60 which is schematically depicted in FIGS. 1A and 1B. As will be seen, the system 60 is used in conjunction with the vibrator 12 to automatically generate a signal 62 which is indicative of the earth's impedance $Z_e(\omega)$ at any location on the earth's surface 10 upon which the vibrator 12 may be placed. This basic aspect of the present invention uniquely eliminates the previous inaccuracies associated with disregarding the effects of earth impedance variation at various locations, or drilling and blasting at the desired locations to physically measure such impedance.

In order to better understand and appreciate the operation of the system 60, it is necessary to first analyze the force and motion interplay among the base plate 18, the reaction mass 20 and an upper portion of the weathered surface 52. When pressurized fluid is forced into the upper cylinder portion 22a through the port 28, the piston 26 (and thus the baseplate 18) is pushed downwardly while the reaction mass 20 is reactively pushed in an upward direction. Similarly, when pressurized hydraulic fluid is forced into the cylinder portion 22b through the port 30, the baseplate 18 is pushed upwardly and the reaction mass 20 is reactively pushed in a downward direction. Thus, both the baseplate 18 and the reaction mass 20 have imparted thereto oscillatory vertical motions which are indicated by the double-ended arrows 64 and 66 in FIG. 1A.

In FIG. 2 there is schematically depicted a simple mechanical model of the vibrator and the underlying weathered earth layer. The model of the vibrator itself consists of the reaction mass 20 having a mass $m_r$, the baseplate 18 having a mass $m_b$ (which includes the mass of the piston rod 24 and the piston 26, but neglects the hold-down mechanism mass), and a dashpot 68 and spring 70 interconnected therebetween. The dashpot 68 has a damping constant $\lambda_r$, while the spring 70 has a spring constant $k_r$. The earth's impedance $Z_e$ is represented by a dashpot 72 and a spring 74 interconnected between the base plate 18 and a rigid reference base 76. The dashpot 72 has a damping constant $\lambda_e$, while the spring 74 has a spring constant $k_e$.

The mechanical equations of motion for this model may be written by equating the inertial reaction forces to the spring, damping, and external forces acting on the vibrator system as follows:

Equation (1):

$$m_b \ddot{x}_b = -(k_e + k_r) x_b - (\lambda_e + \lambda_r) \dot{x}_b + k_r x_r + \lambda_r \dot{x}_r - f(t)$$

Equation (2):

$$m_r \ddot{x}_r = -k_r(x_r - X_b) - \lambda_r(\dot{x}_r - \dot{x}_b) + f(t)$$

where $f(t)$ is the hydraulic force between the reaction mass 20 and the baseplate 18, $x_b$ is the displacement of the baseplate 18, and $x_r$ is the displacement of the reaction mass 20.

Performing a Fourier transform for $(s = i\omega)$ and solving for $x_b$ and $x_r$, the following equations are obtained:
Equations (3) and (4):

$$\begin{pmatrix} x_b \\ x_r \end{pmatrix} = \frac{\hat{F}(s)}{m_r m_b D(s)}$$

$$\begin{pmatrix} m_r s^2 + \lambda_r s + k_r & \lambda_r s + k_r \\ \lambda_r s + k_r & m_b s^2 + (\lambda_e + \lambda_r)s + (k_r + k_e) \end{pmatrix} \begin{pmatrix} -1 \\ 1 \end{pmatrix}$$

wherein: $\hat{F}(s)$ = the Fourier transform of f(t), and D(s) = Determinant, quartic in s with $m_b$, $m_r$ factored out to produce unity as a coefficient of $s^4$.

Equations (3) and (4), as they stand, depend upon a knowledge of $\hat{F}(s)$, which in turn depends on the condition of the earth beneath the baseplate. However, in developing the present invention, it has been determined that the earth's impedance $Z_e(\omega)$ may be expressed independently of the value of F(s) by expressing the ratio between $x_b$ and $x_r$ as a function of frequency (s=i2πf) as follows: Equation (5):

$$\frac{\ddot{x}_b}{\ddot{x}_r} = \frac{x_b}{x_r} = \frac{-m_r s^2}{m_b s^2 + \lambda_e s + k_e} = -\frac{m_r s^2}{m_b s^2 + sZ_e}$$

Since the mass of the baseplate and the reaction mass are known quantities, the earth impedance $Z_e(\omega)$ can be determined uniquely for the seismic frequency of interest. In other words, as can be seen from equation (5), by monitoring the displacements or accelerations of the base plate and reaction masses in the field, in situ earth impedance can be determined. Specifically:

$$-\frac{x_r}{x_b} = \frac{m_b s^2 + sZ_e}{m_r s^2} = \frac{m_b}{m_r} + \frac{Z_e}{m_r s} \text{ or,} \quad \text{Equation (6)}$$

$$Z_e(\omega) = -m_r s \left( \frac{x_r}{x_b} + \frac{m_b}{m_r} \right). \quad \text{Equation (7)}$$

It is to be emphasized that $x_b$ and $x_r$ in equations 5, 6 and 7 are the Fourier components of the baseplate and reaction mass displacements and, hence, depend upon frequency. This unique expression of the earth's impedance $Z_e(\omega)$ is implemented in the compensation system 60 (FIG. 1A) in the following manner.

Conventional accelerometers 80 and 82 are respectively secured to the baseplate 18 and the reaction mass 20 to generate, during operation of the vibrator 12, electrical output signals 84 and 86 which are respectively indicative of the time domain accelerations of the baseplate 18 and the reaction mass 20. Output signals 84, 86 are respectively fed through suitable low-pass filters 88, 90 and analog-to-digital converters 92, 94 to produce digital electric signals 96, 98 respectively corresponding to the analog signals 84, 86. Digital signals 96, 98 are respectively transmitted to conventional fast Fourier transformers (FFT) 100, 102 which responsively output signals 104, 106 that are respectively indicative of the Fourier components $x_b$ and $x_r$ of the baseplate and reaction mass displacements.

Signals 104, 106 are transmitted to a suitable programmable function generator (PFG) 108 which also receives setpoint input signals 110, 112 that are respectively indicative of the baseplate mass $m_b$ and the reaction mass $m_r$. The function generator 108 is programmed to perform the algebraic computation of equation (7), namely $$Z_e(\omega) = -m_r s \left( \frac{x_r}{x_b} + \frac{m_b}{m_r} \right),$$

and responsively generate the signal 62 which is indicative of the Fourier componet $Z_e(\omega)$ of the earth impedance $Z_e$. The signal 62 may be recorded in a suitable recording device 114, if desired, for later use in the cross-correlation process.

It is important to note at this point that the generation of the output signal 62 uniquely provides an accurate and substantially instantaneous signal indicative of the earth's impedance below the baseplate 18. This result is advantageously achieved without the prior necessity of simply ignoring the effects of variations in such earth impedance, or of drilling and blasting at each proposed location of the vibrator 12. This basic aspect of the present invention, in and of itself, can be utilized to significantly enhance the accuracy of the cross-correlation process since the effect on the reflected waves 50a of the impedance of the near surface weathered layer 52 may be accurately taken into account in interpreting the forms of the reflected waves received by the geophones 16. However, the impedance signal 62 is also utilized in the present invention in several other manners which additionally improve the overall hydrocarbon exploration process which may be carried out using the vibrator 12 and the geophones 16.

Referring now to FIG. 1B, the $Z_e(\omega)$ earth impedance signal 62 is also utilized to generate a wavetrain signal 120 which is indicative of the true wave form S(t) propagated into the sub-weathered layer 54. This signal 120 may be used in a manner subsequently described in the wave cross-correlation process to analyze the reflected waves 50a received by the geophones. To generate the wavetrain signal 120, the impedance compensation system 60 is provided with an iterative signal processing unit 122 which includes a comparator 124 and a programmable function generator (PFG) 126. The function generator 126 has programmed therein a suitable theoretical model of the earth's impedance $Z_e(\omega)$ as a function of seven parameters, namely:

$\rho_1$, $\alpha_1$, $\beta_1$, $\rho_2$, $\alpha_2$, $\beta_2$ and H (or, equivalently, $\alpha_1/\alpha_2$, $\alpha_1/\beta_1$, $\alpha_1/\beta_2$, $\rho_1/\rho_2$, $H/\alpha_1$, $\rho_1$, $\alpha_1$) wherein:

$\alpha_1$, $\beta_1$ = the compressional and shear wave velocities, respectively, for the weathered layer
$\rho_1$ = the density of weathered layer
H = the depth of the weathered layer
$\alpha_2$, $\beta_2$ = the compressional and shear wave velocities, respectively, for the underlying half space
$\rho_2$ = the density of the underlying half space While a variety of theoretical impedance models could be utilized that may be expressed in these variables, or variations thereof, the particular theoretical model utilized in the illustrated preferred embodiment of the system 60 may be expressed as follows:

$$Z(\omega) = \frac{1}{Y(\omega)}$$

with $$Y(\omega) = -\frac{i\omega}{2\pi\rho_1\beta_1^2} \int_0^\infty kdk \left( \frac{2 J_1(ka)}{ka} \right)^2 N$$

and $$N = \frac{k\beta_1^2 \nu_1}{\Delta} [e^{(\nu_1+\nu_1')H} M_{12} + e^{(\nu_1-\nu_1')H} M_{14} + e^{(\nu_1'-\nu_1)H} M_{23} - e^{-(\nu_1+\nu_1')H} M_{34}]$$

wherein $J_1$ (ka) is the Bessel function of order 1, and $$\Delta = D_1 e^{(\nu_1+\nu_1')H} + D_2 e^{(\nu_1-\nu_1')H} + (D_3+D_4) + D_5 e^{(\nu_1'-\nu_1)H} + D_6 e^{-(\nu_1+\nu_1')H}.$$

Here, $$D_1 = qM_{12} \qquad D_2 = pM_{14}$$
$$D_3 = 4k\nu_1(2k^2 - k_{\beta1}^2) M_{13} \quad D_4 = 4\nu_1(2k^2 - k_{\beta1}^2) M_{24}$$
$$D_5 = -pM_{23} \qquad D_6 = qM_{34}$$

$M_{ij}$ = minor of the 4×6 matrix M with $i^{th}$ and $j^{th}$ columns removed $$p = (2k^2 - k\beta_1^2)^2 + 4k^2\nu_1\nu_1'$$
$$q = (2k^2 - k\beta_1^2)^2 + 4k^2\nu_1\nu_1'$$

$$M = \begin{bmatrix} -k & -\nu_1' & -k & \nu_1' & k & \nu_2' \\ -\nu_1 & -k & \nu_1 & -k & \nu_2 & k \\ 2k\nu_1 & 2k^2 - k_{\beta1}^2 & -2k\nu_1 & 2k^2 - k_{\beta1}^2 & -2\frac{\mu_2}{\mu_1} k\nu_2 & -\frac{\mu_2}{\mu_1}(2k^2 - k_{\beta2}^2) \\ 2k^2 - k_{\beta1}^2 & 2k\nu_1' & 2k^2 - k_{\beta1}^2 & -2k\nu_1' & -\frac{\mu_2}{\mu_1}(2k^2 - k_{\beta2}^2) & -2\frac{\mu_2}{\mu_1} k\nu_2' \end{bmatrix}$$

The symbols X, Y, X, and W are:

$$X = \frac{\mu_2}{\mu_1} \frac{k_{\beta2}^2}{k^2} - 2\left(\frac{\mu_2}{\mu_1} - 1\right)$$

$$Y = \frac{k_{\beta1}^2}{k^2} + 2\left(\frac{\mu_2}{\mu_1} - 1\right)$$

$$Z = \frac{\mu_2}{\mu_1} \frac{k_{\beta2}^2}{k^2} - \frac{k_{\beta1}^2}{k^2} - 2\left(\frac{\mu_2}{\mu_1} - 1\right)$$

$$W = 2\left(\frac{\mu_2}{\mu_1} - 1\right)$$

The other parameters are defined as:

$k$ = wave number $$k_{\beta1} = \frac{\omega}{\beta_1}$$

$$k_{\beta2} = \frac{\omega}{\beta_2}$$

$$\nu_1 = \sqrt{k^2 - \frac{\omega^2}{\alpha_1^2}}$$

$$\nu_1' = \sqrt{k^2 - \frac{\omega^2}{\alpha_2^2}}$$

$$\nu_2 = \sqrt{k^2 - \frac{\omega^2}{\beta_1^2}}$$

$$\nu_2' = \sqrt{k^2 - \frac{\omega^2}{\beta_2^2}}$$

$\mu_1$ = rigidity for the weathered layer = $\rho_1 \beta_1^2$
$\mu_2$ = rigidity for the underlying half-space = $\rho_2 \beta_2^2$
$\omega$ = $2\pi$ · frequency
= angular frequency There is another way to express the dependence of the theoretical impedance models in terms of parameters. In terms of the dimensionless parameters:

$$k = \frac{\omega}{\alpha_1} \delta$$

$$ka = \left(\frac{\omega a}{\alpha_1}\right)\delta$$

$$\nu_1 H = \frac{\omega H}{\alpha_1} \sqrt{\delta^2 - 1}$$

$$\nu_1' H = \frac{\omega H}{\alpha_1} \sqrt{\delta^2 - \left(\frac{\alpha_1}{\alpha_2}\right)^2}$$

$$kdk = \frac{\omega^2}{\alpha_1^2} \delta d\delta$$

Furthermore, in 4×6 matrix M: the elements in the first row have a common factor of $$\frac{\omega}{\alpha_1},$$

the elements in the second row have a common factor of $$\frac{\omega}{\alpha_1},$$

the elements in the 3rd row have a common factor of $$\left(\frac{\omega}{\alpha_1}\right)^2$$

the elements in the 4th row have a common factor of $$\left(\frac{\omega}{\alpha_1}\right)^2.$$

With these factors removed, the rest are dimensionless combinations of δ, $$\frac{\alpha_1}{\alpha_2},\ \frac{\alpha_1}{\beta_1},\ \frac{\alpha_1}{\beta_2}\ \text{and}\ \frac{\rho_1}{\rho_2}.$$

Combining this and expressions involving ka, kdk, $\nu_1 H_1$, $\nu_1 H$, it can be concluded that:

$$Z_{th}(\omega) = \rho_1 \alpha_1 G\left(\frac{\rho_1}{\rho_2},\ \frac{\alpha_1}{\beta_1},\ \frac{\alpha_1}{\alpha_2},\ \frac{\alpha_1}{\beta_2},\ \frac{\omega H}{\alpha_1},\ \frac{\omega a}{\alpha_1}\right),$$

Where G is a complicated function of six parameters. Since a is a known quantity, by comparing $_e$ to $_{th}$ the seven parameters $\rho_1$, $\alpha_1$, $\beta_1$, $\rho_2$, $\alpha_2$, $\beta_2$ and H (or their equivalents $$\frac{\alpha_1}{\alpha_2},\ \frac{\alpha_1}{\beta_1},\ \frac{\alpha_1}{\beta_2},\ \frac{\rho_1}{\rho_2},\ \frac{H}{\alpha_1},\ \rho_1\ \text{and}\ \alpha_1\ )$$

can be determined individually.

Seven initial parameter estimate signals $128_a$–$128_g$ (which may be simply initial set point adjustments) are transmitted to the function generator 126 and are respectively indicative of initial estimates of the seven aforementioned parameters:

$$\frac{\alpha_1}{\alpha_2},\ \frac{\alpha_1}{\beta_1},\ \frac{\alpha_1}{\beta_2},\ \frac{\rho_1}{\rho_2},\ \frac{H}{\alpha_1},\ \rho_1\ \text{and}\ \alpha_1.$$

The function generator utilizes these input signals to compute, using the programmed—in theoretical model, and responsively transmit to the comparator 124 a signal 134 which is indicative of the theoretical earth impedance $Z_{th}(\omega)$ achieved using the initial input signals $128_a$–$128_g$. The actual earth impedance signal 62 is also transmitted to the comparator 124.

Comparator 124 compares the input signals 62 and 134 and responsively transmits to the function generator 126 a deviation signal 136 which is indicative of the difference between the actual earth impedance $Z_e(\alpha)$ and the theoretical value $Z_{th}(\alpha)$ thereof represented by the theoretical signal 134. Upon receiving the deviation signal 136, the function generator 126 iteratively alters the values of one or more of the seven set point parameter values to generate an adjusted theoretical earth impedance signal 134. This iterative process is repeated until the deviation signal 136 falls to a predetermined level. When such deviation minimization is achieved, the function generator 126 responsively generates output signals 138, 140 and 142 which are respectively indicative of the actual parameters $$\left(\frac{\alpha_1}{\alpha_2}\right),\ \left(\frac{H}{\alpha_1}\right)\text{and}\left(\frac{\rho_1}{\rho_2}\right)$$

of the weathered surface layer 52 and underlying half space immediately beneath the baseplate 18.

The signals 138, 140 and 142 are transmitted to a programmable function generator (PFG) 144 which is programmed to utilize the received parameter signals 138, 140 and 142 and responsively generate a weathered layer filter signal 146, denoted by $F_1(\omega)$, which is representative of the seismic response of a single weathered layer model that is expressed by the equation:

$$F_1(\omega) = \frac{e^{i\left(\frac{\omega H}{\alpha_2}\right)}}{\left(\frac{\rho_2}{\rho_1}\right)\cos\left(\frac{\omega H}{\alpha_1}\right) + i\left(\frac{\alpha_1}{\alpha_2}\right)\sin\left(\frac{\omega H}{\alpha_1}\right)} \quad \text{Equation (8)}$$

The weathered layer filter signal 146 is transmitted to a signal multiplier 148 which also received a signal 150 indicative of the Fourier component $F_g(\omega)$ of the actual ground force being imparted to the baseplate 18. Referring again to FIG. 1A, this actual ground force signal 150 is achieved by the use of a suitable function generator (FG) 152 which receives the baseplate and reaction mass digital acceleration signals 96 and 98, and a pair of set point input signals 154, 156 which are respectively indicative of the base plate mass $m_b$ and the reaction mass $m_r$. The function generator 152 responsively generates an output signal 158 having a magnitude equal to $(m_b\ddot{x}_b + m_r\ddot{x}_r)$ which is indicative of the actual ground force $F_g(t)$ in the time domain. A fast Fourier transformer (FFT) 160 is utilized to convert the time domain signal 158 to the Fourier component signal 150 transmitted to the signal multiplier 148 depicted in FIG. 1B.

The signal multiplier 148 multiplies the magnitudes of its two input signals 146, 150 and generates an output signal 162 which is representative of the Fourier component $S(\omega)$ of the actual seismic wave train propagated into the earth by the base plate 18. An inverse Fourier transformer (FFT$^{-1}$) 164 is utilized to convert the signal 162 to the signal 120 which is the time domain equivalent $S(t)$ of the signal 162.

Importantly, the final output signal 120 is representative of the true wave form transmitted from the base plate 18 into the sub-weathered layer 54, and can be used in the cross-correlation process. There is simply no need, as was previously necessary with conventional vibrator systems, to in any manner compensate for the earth impedance effect on the propagated seismic waves 50. Such compensation has already been automatically achieved by the signal multiplier 148. Accordingly, the output signal 120 may be directly utilized in the cross-correlation process.

To utilize the signal 120 in such cross-correlation process, the signal may be converted in a conventional manner to generate a wavelet signal which is symmetric and compressed in time. As is well known in the seismic exploration art, the necessary wavelet signal could be generated by utilizing a suitable inverse filter, or by using one of several known direct correlation methods.

While the signal 120, as just described, can be generated in the field for cross-correlation purposes, such signal may also be generated at a later time in a seismic processing center. For such purposes, the circuit elements 148 and 164 could be deleted and the signals 146 and 150 stored in suitable recording devices 166, 168 for use in subsequently generating the wave train-representative signal 120.

According to another very important aspect of the present invention, the earth impedance determination and compensation system 60 also provides for the control of the vibrator 12 in a manner which uniquely affords it the ability to impart to the propagated seismic waves 50 a predetermined form regardless of variances in the earth's impedance. Stated otherwise, regardless of where the vibrator 12 is placed along the earth's surface 10, the system 60 automatically compensates for the effect on the form of the propagated waves 50 of the weathered layer impedance and adjusts the operation of the vibrator 12 to maintain a constant, predetermined form of the waves 50 entering the sub-weathered layer 54.

This advantageous result is achieved by the use of a suitable signal generator 170 which outputs a signal 172 indicative of $W_d(\omega)$, the Fourier component of the desired wave train form of the propagated seismic waves 50 entering the subweathered layer 54. Output signal 172 is transmitted to a signal divider 174 which also receives the weathered layer filter signal 146. The signal divider 174 divides the signal 172 by the signal 146 and responsively generates an output signal 176 which is indicative of the Fourier component $F_{gd}(\omega)$ of the desired ground force. Signal 176 is transmitted to an inverse Fourier transformer (FFT$^{-1}$) 178 which outputs a signal 180 which represents the timed domain equivalent $F_{gd}(t)$ of the desired ground force signal 176.

Signal 180 is transmitted to a comparator 182 which also receives the actual ground force signal 158 representing the time domain actual ground force $F_g(t)$. Comparator 182 outputs a correcting signal 42 which represents the deviation between the desired ground force signal 180 and the actual ground force signal 158.

This correction signal 42 is transmitted to the summer 34 (FIG. 1A) which combines the signal 42 with the master driving signal 40 to generate the corrected driving signal 44. In this manner, the corrected driving signal 44 operates the valve 36 in a manner such that an impedance compensation factor is built into the propagated seismic waves 50 such that as they enter the sub-weathered layer 54 they are of a predetermined form. This described control loop will, of course, achieve the same results regardless of where the vibrator 12 is placed along the earth's surface 10.

The impedance determination and compensation system 60 just described is also useful in the "static correction" process by which varying elevations of the vibrator 12 and/or the geophones 16, and variances in the weathered-layer topography are corrected for. It is well known that the relative elevations of the vibrator and-/or the geophones at different transmitting and receiving locations alter the total travel time for the seismic waves between the vibrator baseplate and the geophones. This total wave travel time is also affected by the topography of the weathered-layer 52. Heretofore, this static correction process involved making the elevational correction (by surveying the actual transmitting and receiving sites and making the necessary elevational corrections) and then factoring in a correction for the travel time alteration attributable to the near-surface weathered layer. This latter correction factor typically entailed either making an assumption as to the time delay characteristics of the weathered layer, or an actual measurement thereof utilizing the previously described drilling and blasting method.

In the present invention, however, the necessary static correction attributable to the near surface weathered-layer is automatically and very accurately achieved by the generation of the output signal 140 which is indicative of the travel time thickness $$\left( \frac{H}{\alpha_1} \right)$$

of the weathered surface layer 52. The travel time thickness signal 140 may be conveniently recorded, using a suitable recording device 184, at each location of the vibrator 12 for use in a subsequent static correction process. It will be readily appreciated that utilizing this step in the static correction process beneficially eliminates the guess work and/or expense and inconvenience associated with conventional methods of statically correction for the effects of the near-surface weathered layer.

The parameter output signals 138, 140 and 142 together with output signals for $$\rho_1, \ \alpha_1, \frac{\alpha_1}{\beta_1}, \frac{\alpha_2}{\beta_2}$$

can additionally be utilized to determine the form of the compressional and shear waves (i.e., the "P" and "S" waves) which are actually being transmitted from the vibrator 12. This knowledge is quite useful in designing seismic source arrays (in which several groups of vibrators may be used to generate the seismic waves 50) which either maximize the seismic waves in the direction of a particular target under investigation (i.e., to "focus" the seismic wave pattern) or to minimize the excitation of undesired seismic waves. The conventional method of adjusting the source arrays has been to utilize an assumed model of the P and S wave forms and then, by trial and error, make various adjustments in the source array in an attempt to optimize the collective pattern of the propagated seismic waves.

This necessity is eliminated in the present invention by utilizing the parameter output signals 138, 140 and 142 together with output signals for $$\rho_1, \ \alpha_1, \frac{\alpha_1}{\beta_1}, \frac{\alpha_2}{\beta_2}$$

to rather precisely determine the actual P and S wave forms actually being transmitted. Utilizing the parameter output signals in this manner permits the more rapid and precise arrangement of the source array to either focus the waves on a desired target or to minimize the excitation of undesired seismic wave forms which would otherwise render the interpretation of the reflected waves more difficult.

It can be seen from the foregoing that the present invention provides a seismic source control and output system which automatically determines the earth impedance at a given vibrator location and utilizes the determined earth impedance in a variety of manners to substantially eliminate the problems and uncertainties in seismic hydrocarbon exploration previously attributable to the vagaries of varying near-surface weathered layer earth impedance. Specifically, the system 60 automatically generates a signal indicative of the actual earth impedance below the vibrator, controls the vibrator to generate seismic waves of predetermined form into the sub-weathered-layer of the earth, generates a signal representative of the true wave form sent into the sub-weathered-layer, automatically generates a signal indicative of the travel time thickness of the weathered-layer, and further generates signals which may be utilized to accurately determine the form of the P and S waves actually being transmitted from the vibrator. These and other features of the system 60 greatly improve both the efficiency and accuracy of the exploration process, including the cross-correlation and static correction aspects thereof.

While the previously described system 60 has been illustrated and described in conjunction with a conventional hydraulically operated vibrator, it will be appreciated by those skilled in the seismic exploration art that the system could also be used in conjunction with other types of seismic sources which utilize a ground member and a reaction mass. Specifically, the system 60 could also be used in conjunction with various "impulse" types of seismic generators such as those employing a pneumatically assisted weight drop device which impacts upon an earth-coupled baseplate, or a system of the type which employs a high pressure air pulse that simultaneously reacts against a recoiling cylinder and a diaphragm member positioned on the earth's surface.

The foregoing detailed description is to be clearly understood as given by way of illustration and example only, the spirit and scope of the present invention being limited solely by the appended claims.

What is claimed is:

1. An earth impedance determination and compensation system for use with a seismic energy source having a base portion in contact with the earth, and a reaction mass portion, said system comprising:
   (a) means for generating acceleration signals indicative of the accelerations of said base portion and said reaction mass portion;
   (b) means for transforming said acceleration signals into corresponding Fourier component signals;
   (c) means for generating mass signals indicative of the masses of said base portion and said reaction mass portion; and
   (d) means for combining said Fourier component signals and said mass signals and generating an earth impedance signal representative of the near-surface weathered layer earth impedance below said seismic energy source,
   said means for generating acceleration signals comprising accelerometers operatively connected to said base portion and said reaction mass portion of said seismic energy source,
   said means for transforming said acceleration signals comprising means for filtering said acceleration signals, means for converting said acceleration signals into digital acceleration signals, and means for converting said digital acceleration signals into Fourier component signals corresponding thereto,
   said means for combining said Fourier component signals and said mass signals comprising function generator means for receiving said Fourier component signals and said mass signals and responsively generating said earth impedance signal, and the magnitude of said earth impedance signal being equal to:

$$-m_r s \left( \frac{x_r}{x_b} + \frac{m_b}{m_r} \right)$$

where $m_r$ is the mass of said reaction mass portion, $m_b$ is the mass of said base portion, $x_r$ is the Fourier component of the displacement of said reaction mass portion, $x_b$ is the Fourier component of the displacement of said base portion, and s is a parameter indicative of frequency.

2. An earth impedance determination and compensation system for use with a seismic energy source having a base portion in contact with the earth, and a reaction mass portion, said system comprising:
   (a) means for generating acceleration signals indicative of the accelerations of said base portion and said reaction mass portion;
   (b) means for transforming said acceleration signals into corresponding Fourier component signals;
   (c) means for generating mass signals indicative of the masses of said base portion and said reaction mass portion;
   (d) means for combining said Fourier component signals and said mass signals and generating an earth impedance signal representative of the near-surface weathered layer earth impedance below said seismic energy source; and
   (e) means for utilizing said earth impedance signal to generate parameter signals combinatively indicative of the compressional and shear wave forms of seismic waves generated into the earth by said base portion.

3. An earth impedance determination and compensation system for use with a seismic energy source having a base portion in contact with the earth, and a reaction mass portion, said system comprising:
   (a) means for generating acceleration signals indicative of the accelerations of said base portion and said reaction mass portion;
   (b) means for transforming said acceleration signals into corresponding Fourier component signals;
   (c) means for generating mass signals indicative of the masses of said base portion and said reaction mass portion;
   (d) means for combining said Fourier component signals and said mass signals and generating an earth impedance signal representative of the near-surface weathered layer earth impedance below said seismic energy source; and
   (e) means for utilizing said earth impedance signal to generate parameter signals combinatively indicative of the compressional and shear wave forms of seismic waves generated into the earth by said base portion,
   said means for utilizing said earth impedance signal comprising iterative signal generator means for receiving said earth impedance signal, generating a theoretical earth impedance signal based upon a theoretical impedance model expressable in terms of predetermined parameters including parameters combinatively indicative of said compressional and shear wave forms, adjusting said theoretical earth impedance signal until it at least closely approximates said first-mentioned earth impedance signal, and then generating parameter output signals having magnitudes that are combinatively indicative of the compressional and shear wave forms of seismic waves generated into the earth by said base portion.

4. The system of claim 3 wherein:
one of said parameters is indicative of the travel time thickness of the near-surface weathered earth layer beneath said base portion of said seismic energy source.

5. An earth impedance determination and compensation system for use with a seismic energy source having a base portion in contact with the earth, and a reaction mass portion, said system comprising:
(a) means for generating acceleration signals indicative of the accelerations of said base portion and said reaction mass portion;
(b) means for transforming said acceleration signals into corresponding Fourier component signals;
(c) means for generating mass signals indicative of the masses of said base portion and said reaction mass portion;
(d) means for combining said Fourier component signals and said mass signals and generating an earth impedance signal representative of the near-surface weathered layer earth impedance below said seismic energy source; and
(e) means for utilizing said earth impedance signal to generate a wavetrain signal representative of the form of the seismic wavetrain being generated by said seismic energy source into the sub-weathered layer portion of the earth beneath said seismic energy source.

6. The system of claim 5, wherein:
said means for utilizing said earth impedance signal comprise means for converting said earth impedance signal into a weathered layer filter signal representative of the seismic response of the near-surface weathered earth layer beneath said base portion, means for generating a ground force signal representative of the ground force function being imparted to said base portion, and means for receiving said weathered layer filter signal and said ground force signal and responsively generating said wavetrain signal.

7. An earth impedance determination and compensation system for use with a seismic energy source having a base portion in contact with the earth, and a reaction mass portion, said system comprising:
(a) means for generating acceleration signals indicative of the accelerations of said base portion and said reaction mass portion;
(b) means for transforming said acceleration signals into corresponding Fourier component signals;
(c) means for generating mass signals indicative of the masses of said base portion and said reaction mass portion;
(d) means for combining said Fourier component signals and said mass signals and generating an earth impedance signal representative of the near-surface weathered layer earth impedance below said seismic energy source; and
(e) means for utilizing said earth impedance signal to generate a wavetrain signal representative of the form of the seismic wavetrain being generated by said seismic energy source into the sub-weathered layer portion of the earth beneath said seismic energy source, said means for utilizing said earth impedance signal comprising means for converting said earth impedance signal into a weathered layer filter signal representative of the seismic response of the near-surface weathered earth layer beneath said base portion, means for generating a ground force signal representative of the ground force function being imparted to said base portion, and means for receiving said weathered layer filter signal and said ground force signal and responsively generating said wavetrain signal,
said means for converting said earth impedance signal into said weathered layer filter signal comprising means for receiving said earth impedance signal and input signals representative of estimated magnitudes of parameters with which the earth impedance may be combinatively expressed, and responsively generating final parameter signals having magnitudes at least closely approximating the magnitudes of selected ones of said parameters represented by the magnitude of said earth impedance signal, and means for converting said final parameter signals into said weathered layer filter signal.

8. The system of claim 7 wherein:
said means for generating said ground force signal comprise means for receiving said acceleration signals, and said mass signals, and responsively generating said ground force signal.

9. The system of claim 8 wherein:
said means for receiving said weathered layer filter signal and said ground force signal include means for multiplying said weathered layer filter signal by said ground force signal.

10. An earth impedance determination and compensation system for use with a seismic energy source having a base portion in contact with the earth, and a reaction mass portion, said system comprising:
(a) means for generating acceleration signals indicative of the accelerations of said base portion and said reaction mass portion;
(b) means for transforming said acceleration signals into corresponding Fourier component signals;
(c) means for generating mass signals indicative of the masses of said base portion and said reaction mass portion; and
(d) means for combining said Fourier component signals and said mass signals and generating an earth impedance signal representative of the near-surface weathered layer earth impedance below said seismic energy source,
said seismic energy source being driven by a driving signal,
said system further comprising means, utilizing said earth impedance signal, for adjusting said driving signal to impart to said base portion of said seismic energy source a ground force function which will cause said base portion to generate into the sub-weathered layer earth portion beneath it a seismic wavetrain of predetermined form regardless of variances in weathered layer earth impedance beneath said base portion.

11. An earth impedance determination and compensation system for use with a seismic energy source having a base portion in contact with the earth, and a reaction mass portion, said system comprising:
(a) means for generating acceleration signals indicative of the accelerations of said base portion and said reaction mass portion;

(b) means for transforming said acceleration signals into corresponding Fourier component signals;

(c) means for generating mass signals indicative of the masses of said base portion and said reaction mass portion; and (d) means for combining said Fourier component signals and said mass signals and generating an earth impedance signal representative of the near-surface weathered layer earth impedance below said seismic energy source.

said seismic energy source being driven by a driving signal, said system further comprising means, utilizing said earth impedance signal, for adjusting said driving signal to impart to said base portion of said seismic energy source a ground force function which will cause said base portion to generate into the sub-weathered layer earth portion beneath it a seismic wavetrain of predetermined form regardless of variances in weathered layer earth impedance beneath said base portion, said means for adjusting said driving signal comprising means for converting said earth impedance signal to a weathered layer filter signal representative of the seismic response of the near-surface weathered earth layer beneath said seismic energy source, means for generating a desired wavetrain form signal representative of a seismic wavetrain desired to be generated into the sub-weathered layer earth portion beneath said seismic energy source, means for utilizing said weathered layer filter signal and said desired wavetrain form signal to generate a desired ground force signal indicative of the seismic energy source ground force function necessary to generate from said seismic energy source said desired wavetrain form, means for generating an actual ground force signal indicative of the actual ground force function being imparted to said seismic energy source, means for comparing said desired ground force signal to said actual ground force signal and responsively generating a correcting signal indicative of the difference therebetween, and means for utilizing said correcting signal to adjust said driving signal.

12. The system of claim 11 wherein:

said means for converting said earth impedance signal to a weathered layer filter signal comprise means for converting said earth impedance signal to parameter signals corresponding to selected ones of parameters combinatively indicative of said earth impedance signal, and means for converting said parameter signals into said weathered layer filter signal.

13. The system of claim 11 wherein:
said means for utilizing said weathered layer filter signal and said desired wavetrain form signal comprise signal divider means for dividing said desired wavetrain form signal by said weathered layer filter signal.

14. The system of claim 11 wherein:

said seismic energy source is a hydraulically driven vibrator having a control valve connected to said reaction mass portion and operated by said driving signal; and said means for utilizing said correcting signal to adjust said driving signal comprise summer means for receiving said driving signal and said correcting signal and responsively transmitting to said control valve an adjusted driving signal.

15. An earth impedance determination and compensation system for use with a seismic energy source having a base portion and a reaction mass portion, said system comprising:

(a) means for generating acceleration and mass signals indicative of the accelerations and masses of said base portion and said reaction mass portion;

(b) means for utilizing said acceleration and mass signals to generate an earth impedance signal indicative of the earth impedance beneath said seismic energy source; and (c) means, utilizing said earth impedance signal, for generating a wavetrain signal representative of the form of a seismic wavetrain being generated by said seismic energy source into the sub-weathered layer portion of the earth beneath said seismic energy source.

16. An earth impedance determination and compensation system for use with a seismic energy source having a base portion and a reaction mass portion, said system comprising:

(a) means for generating acceleration and mass signals indicative of the accelerations and masses of said base portion and said reaction mass portion;

(b) means for utilizing said acceleration and mass signals to generate an earth impedance signal indicative of the earth impedance beneath said seismic energy source; and (c) means, utilizing said earth impedance signal, for controlling said seismic energy source in a manner causing it to generate into the sub-weathered layer portion of the earth a seismic wavetrain having a predetermined form which is substantially independent of the earth impedance beneath said seismic energy source.

17. A method of determining the earth impedance below a seismic energy sorce having a base portion in contact with the earth, and a reaction mass portion, said method comprising the steps of:

(a) generating a Fourier component signal $x_b$ indicative of the displacement of said base portion;

(b) generating a Fourier component signal $x_r$ indicative of the displacement of said reaction mass portion;

(c) generating a mass signal $m_b$ indicative of the mass of said base portion;

(d) generating a mass signal $m_r$ indicative of the mass of said reaction mass portion; and (e) utilizing said Fourier component signals and said mass signals to generate a signal $Z_e(\omega)$ indicative of the Fourier component of the earth impedance below said seismic energy source and having a magnitude of $$-m_r s \left( \frac{x_r}{x_b} + \frac{m_b}{m_r} \right)$$

wherein s equals the square root of minus one times angular frequency $\omega$.

18. A method of generating a signal representative of the actual seismic wavetrain being transmitted into the sub-weathered layer portion of the earth by a seismic energy source having a base portion in contact with the earth, and a reaction mass portion, said method comprising the steps of:
 (a) utilizing acceleration of said base portion and said reaction mass portion to generate an earth impedance signal indicative of the near-surface weathered earth layer impedance beneath said seismic energy source, and a ground force signal indicative of the ground force being generated by said seismic energy source;
 (b) converting said earth impedance signal to a weathered layer filter signal indicative of the seismic response of the weathered earth layer beneath said seismic energy source; and
 (c) utilizing said ground force signal and said weathered layer filter signal to generate a wavetrain signal representative of the actual seismic wavetrain being transmitted into the sub-weathered layer portion of the earth by said seismic energy source.

19. A method of generating a signal representative of the actual seismic wavetrain being transmitted into the sub-weathered layer portion of the earth by a seismic energy source having a base portion in contact with the earth, and a reaction mass portion, said method comprising the steps of:
 (a) utilizing acceleration of said base portion and said reaction mass portion to generate an earth impedance signal indicative of the near-surface weathered earth layer impedance beneath said seismic energy source, and a ground force signal indicative of the ground force being generated by said seismic energy source;
 (b) converting said earth impedance signal to a weathered layer filter signal indicative of the seismic response of the weathered earth layer beneath said seismic energy source;
 and
 (c) utilizing said ground force signal and said weathered layer filter signal to generate a wavetrain signal representative of the actual seismic wavetrain being transmitted into the sub-weathered layer portion of the earth by said seismic energy source,
 said converting step comprising converting said earth impedance signal to parameter signals corresponding to selected ones of parameters combinatively indicative of said earth impedance, and converting said parameter signals into said weathered layer filter signal.

20. The method of claim 19 wherein:
 said step of utilizing said ground force signal and said weathered layer filter signal includes the step of multiplying said ground force signal and said weathered layer filter signal.

21. A method of controlling a seismic energy source having a base portion in contact with the earth, and a reaction mass portion, said seismic energy source being controlled by a driving signal, said method comprising the steps of:
 (a) utilizing motion of said base portion and said reaction mass portion to generate an earth impedance signal indicative of the near-surface weathered earth layer impedance beneath said seismic energy source, and an actual ground force signal indicative of the actual ground force being generated by said seismic energy source;
 (b) converting said earth impedance signal to a weathered layer filter signal indicative of the seismic response of the weathered earth layer beneath said seismic energy source;
 (c) generating a desired wavetrain signal representative of a predetermined wavetrain form;
 (d) utilizing said actual ground force signal and said desired wavetrain signal to generate a desired ground force signal indicative of a ground force function which, if transmitted to the earth by said seismic energy source, would cause said seismic energy source to transmit to the sub-weathered earth layer beneath it a wavetrain corresponding in form to that of said desired wavetrain signal;
 (e) comparing said actual ground force signal and said desired ground force signal and responsively generating a correction signal indicative of the difference therebetween;
 and
 (f) utilizing said correction signal to adjust said driving signal to impart said ground force function to said seismic energy source.

22. A method of generating a signal indicative of the travel time thickness of the weathered-surface earth layer below a seismic energy source for use in a static correction process, said seismic energy source having a base portion in contact with the earth, and a reaction mass portion, said method comprising the steps of:
 (a) utilizing motion of said base portion and said reaction mass portion to generate an actual earth impedance signal indicative of the actual impedance of the near-surface weathered earth layer below said seismic energy source;
 (b) utilizing a predetermined theoretical earth impedance model, expressable in terms of preselected parameters including said travel time thickness, to generate a theoretical earth impedance signal;
 (c) comparing said actual and theoretical earth impedance signals and responsively generating a deviation signal indicative of the difference in magnitude therebetween;
 (d) utilizing said deviation signal to adjust the magnitudes of said parameters in said theoretical model, and the magnitude of said theoretical earth impedance signal, to final magnitudes thereof so that the magnitude of said deviation signal is reduced to a predetermined level; and
 (e) generating a signal indicative of the final magnitude of said travel time thickness parameter.

23. A method of determining the compressional and shear wave forms of seismic waves transmitted into the earth by a seismic energy source having a base portion and a reaction mass portion, said method comprising the steps of:
 (a) utilizing motion of said base portion and said reaction mass portion to generate an actual earth impedance signal indicative of the actual impedance of the near-surface weathered earth layer below said seismic energy source;
 (b) utilizing a predetermined theoretical earth impedance model, expressable in terms of preselected parameters combinatively indicative of said compressional and shear wave forms, to generate a theoretical earth impedance signal;
 (c) comparing said actual and theoretical earth impedance signals and responsively generating a deviation signal indicative of the difference in magnitude therebetween;

(d) utilizing said deviation signal to adjust the magnitudes of said parameters, and the magnitude of said theoretical earth impedance signal, to final magnitudes thereof so that the magnitude of said deviation signal is reduced to a predetermined level;

(e) generating final parameter signals indicative of the final magnitudes of selected ones of said parameters; and (f) utilizing said final parameter signals to determine said compressional and shear wave forms.

24. A method of arranging a seismic source array, composed of a plurality of seismic energy sources, to optimize the seismic wave pattern generated therefrom into the earth, said method comprising the steps of:

(a) providing a seismic energy source having a base portion in contact with the earth, and a reaction mass portion;

(b) operating said seismic energy source;

(c) generating acceleration signals indicative of the accelerations of said base portion and said reaction mass portion;

(d) utilizing said accelerations signals to generate an earth impedance signal indicative of the earth impedance below said seismic energy source;

(e) utilizing said earth impedance signal to generate parameter signals combinatively indicative of the compressional and shear wave forms being generated by said seismic energy source;

(f) determining from said parameter signals said compressional and shear wave forms;

(g) utilizing the determined compressional and shear wave forms to relatively position the seismic energy sources in an array thereof to optimize the seismic wave pattern generated from said array into the earth.

* * * * *